(12) United States Patent
McQuilken

(10) Patent No.: US 8,131,596 B2
(45) Date of Patent: Mar. 6, 2012

(54) METHOD AND SYSTEM OF PAYMENT FOR PARKING USING A SMART DEVICE

(76) Inventor: George C. McQuilken, Portsmouth, NH (US)

( * ) Notice: Subject to any disclaimer, the term of this patent is extended or adjusted under 35 U.S.C. 154(b) by 205 days.

(21) Appl. No.: 12/759,814

(22) Filed: Apr. 14, 2010

(65) Prior Publication Data

US 2010/0268618 A1 Oct. 21, 2010

Related U.S. Application Data

(60) Provisional application No. 61/169,508, filed on Apr. 15, 2009.

(51) Int. Cl.
*G06Q 30/00* (2012.01)
(52) U.S. Cl. .................................... 705/26.1; 705/418
(58) Field of Classification Search ................. 705/26.1, 705/418
See application file for complete search history.

(56) References Cited

U.S. PATENT DOCUMENTS

| | | | |
|---|---|---|---|
| 6,889,899 B2 * | 5/2005 | Silberberg | 235/384 |
| 7,237,716 B2 * | 7/2007 | Silberberg | 235/384 |
| 2002/0008639 A1 * | 1/2002 | Dee | 340/932.2 |
| 2002/0032601 A1 * | 3/2002 | Admasu et al. | 705/13 |
| 2003/0010821 A1 * | 1/2003 | Silberberg | 235/382 |
| 2004/0059693 A1 * | 3/2004 | Hausen et al. | 705/418 |
| 2004/0068433 A1 * | 4/2004 | Chatterjee et al. | 705/13 |
| 2005/0190076 A1 * | 9/2005 | Howard et al. | 340/932.2 |
| 2005/0286421 A1 * | 12/2005 | Janacek | 370/231 |
| 2006/0106504 A1 * | 5/2006 | Carpenter | 701/1 |
| 2006/0116972 A1 * | 6/2006 | Wong | 705/418 |
| 2008/0071611 A1 * | 3/2008 | Lovett | 705/13 |
| 2008/0114675 A1 * | 5/2008 | Ward | 705/39 |
| 2010/0090865 A1 * | 4/2010 | Dasgupta | 340/932.2 |

OTHER PUBLICATIONS

Carriers Wary of Mobile Phone Payments. American Banker, vol. 170, No. 119, p. 11, Jun. 22, 2005.*

* cited by examiner

*Primary Examiner* — Yogesh C Garg
*Assistant Examiner* — Matthew Zimmerman
(74) *Attorney, Agent, or Firm* — Mesmer & Deleault, PLLC

(57) ABSTRACT

In a first embodiment, a location-aware payment system including: a smart device, the smart device including: a location sensing mechanism for detecting its location; an identification mechanism for identifying the smart device; and a wireless communication mechanism; a display device having at least one of an indicator light, a printed receipt, and a digital read out; and a server, the server including: a wireless communication mechanism communicating with the smart device and display device; and a software program loaded into the server that receives and sends out communications, calculates amounts due between a payor and a payee, issues authorization codes, and performs banking transactions between a payor and a payee. In a second embodiment, the invention is a location-aware payment system including: at least two smart devices, the smart devices including: a location sensing mechanism for detecting its location; an identification mechanism for identifying the smart device; and a wireless communication mechanism; and a server, the server including: a wireless communication mechanism communicating with the smart devices; and a software program loaded into the server that receives and sends out communications, calculates amounts due between a payor and a payee, issues authorization codes, and performs banking transactions between a payor and a payee.

10 Claims, 5 Drawing Sheets

METHOD AND SYSTEM OF PAYMENT FOR PARKING USING A SMART DEVICE

BACKGROUND OF THE INVENTION

1. Field of the Invention

The present invention relates generally to payment systems using general purpose smart devices, including parking systems.

2. Description of the Prior Art

Parking space in a city is a scarce resource that is allocated to those who will pay for it on a first-come, first served basis. Cities want to maximize their revenue from parking space while being fair to its customers. There are four major groups of parking technologies for collecting parking revenue.

First—The Traditional Single Space Parking Meter.

Advantages—It is near the vehicle and will take standard national coins, along with, in some more expensive versions, a download from a pre-paid debit card or a stored-value smart card. From the city's perspective, it is relatively inexpensive (approximately $250 per meter) to purchase and maintain, and the parking public is familiar with them.

Disadvantages—As more cities focus or raising the fees for parking, the single space meter is limited by the number of quarters the user can be expected to have available. If parking increases to two dollars per hour, the user will need to have 16 quarters to park for two hours. Single space meters require frequent collections as the cost of parking rises, and that expense is burdensome to the city. Single space meters are considered by many to be an ugly blight on the city's "streetscape", and so there is an urban aesthetic drive to eliminate them in many cities. Single space meters are difficult to program for flexible rates (different rates for different times of day) or for rate changes.

Single space meters contain only small consumer style batteries, so their ability to support wireless communications or new forms of input, such as Near Field Communication (NFC), is very limited.

Second—The Multi-Space Parking Meter.

Advantages—The multi-space meter will allow one to pay with not only coins, but also, in some cases, paper money and credit/debit/pre-paid cards. They are usually in a communications network with the city or parking authority, so they can provide up to date information in real time regarding such issues as coin collection, electronic payments, and maintenance needs. They also allow for a cleaner "streetscape" because you only have one kiosk for approximately eight parking spaces. Battery requirements are often low because multi-space meters are in part operated on solar energy, depending on the local climate. Multi-space meters are designed with more capacity for IT intelligence; therefore they can more easily be programmed for flexible rates and dynamic rate change.

Disadvantages—Multi-space meters are expensive, averaging about $8,000-10,000 per kiosk—or $1,000-1,200 per parking space, as opposed to $250 per space with single space meters. Users are always initially unfamiliar with the meters and need to be trained in how to use them.

In inclement weather, or extreme heat, the process of going to the meter, getting a receipt, returning to the user's vehicle, opening your door, and placing the receipt on the dashboard becomes very inconvenient and possibly hazardous when the ground is icy or snowy.

There are hidden costs associated with multi-space meters. These are the charges for processing electronic payments and for delivering the payment information from the meter to the city before the payment process begins. The city has little or no control over those expenses.

There is an ongoing concern about the confidentiality of credit/debit card information in multi-space meters. Identity theft is a concern. Battery capacity, although great compared with single-space meters, still puts limits on wireless communication or NFC.

Third—Cell Phone Parking.

In these systems, the user parks and then calls a special telephone number which allows the user to identify the space (usually by a visible number assigned to the space), specify the amount of time to be purchased, and to update that amount of time, if necessary, later during the purchased time period.

Advantages—The user does not need to leave the vehicle in order to pay for parking. The user also does not need any kind of cash or credit card to make the payment. From the city's perspective, the cell phone payment system allows the city to change rates dynamically, as long as it's easy for the city to notify the cell phone parking vendor of any rate change. There is no cost of collection, unless the cell phone vendor charges a fee.

Disadvantages—It is difficult and cumbersome for the city's meter enforcement personnel to establish whether or not a vehicle is in violation of its allotted stay because the officer needs to call in to a central registry for every vehicle. There is nothing on, in, or around the vehicle to immediately establish its payment status. There have been "queuing" problems—when multiple calls to the cell phone vendor are being made simultaneously. User frustration with the increased cost of making multiple calls—and the time wasted in doing so—will create a significant frustration factor.

Fourth—In Vehicle Parking Meter Devices.

These are small devices that a driver may display on a dashboard or hang from a rear-view mirror that display an amount of time that the driver has paid out of a pre-paid account with the city.

Advantages—The user does not have to leave the car to pay for parking, nor does the user have any need to handle cash or expose credit/debit card information. The in-vehicle meter is relatively easy for the parking enforcement officer to read. There are no communication fees connected to the delivery of the service.

Disadvantages—The in-vehicle meter can be stolen fairly easily. It is often complex to reload value on the in-vehicle meter, since it's the device itself that has to be re-loaded. This may involve trips to city hall, police headquarters, or the local parking authority. All of the current companies offering this kind of service in the US are of either European or Israeli origin, and are primarily focused on developing business/technology models that will fit the somewhat different requirements of the European/Israeli customer base.

Therefore, what is needed is to have a way to pay for parking that has maximal convenience factors and can be used in multiple communities without regard to geography. It should also provide way to pay that has all of the advantages of electronic payment without fear of identity theft or other security issues.

SUMMARY OF THE INVENTION

It is an object of the present invention to provide a way to pay for parking that has maximal convenience factors and can be used in multiple communities without regard to geography. The present invention achieves this and other objectives by providing a general purpose payments system built for smart devices capable of calculating their current location and executing user-provided software. In certain environments, the invention reduces the complexity, increases the speed, and simplifies the user interfaces required for payment transactions, since the system automatically determines who to pay, how much to pay, and even which currency to use. There are approximately 365 million vehicles in the United States. Of those, 175 million currently pay for parking.

Depending on the observer, the present invention can be seen as complimentary or competitive to current cash, debit, and credit payments and currency exchange operations. The present invention is the first payment system to:

- Combine 3G, WiFi, NFC, and Bluetooth Communication
- Use hybrid automatic location sensing means. XPS, provided by Skyhook Wireless and as supported in the IPHONE, is the world's first true hybrid positioning system. By combining the unique benefits of GPS, cell tower triangulation, and Wi-Fi positioning, XPS delivers the same level of location quality whether indoors or outdoors, in the country or downtown. The location sensing means can triangulate a position from any one of the wireless technologies supported by the device, including Satellite GPS, cell tower triangulation, WiFi triangulation, or a combination of the three using advanced hybrid positioning algorithms. Future implementations may use additional technologies, including Bluetooth and NFC.
- Be inherently multi-city, country, or multi jurisdictional,
- Run on a user owned general purpose device such as an IPHONE® (or on over 100 current devices with similar capabilities),
- Allow convenient payments, similar to debit cards and EZ-Pass as well as more traditional credit card payments and checking account withdrawal.
- Provide detailed analytics to both buyers and sellers,
- Provide real-time currency conversion, allowing buyers and sellers to operate concurrently in their home currencies,
- Link directly to other location-based services to find a garage, a shop, or a service, and
- Allow mobile buyers and sellers to locate one another, to synchronize their devices, and to do business together.

To illustrate the versatility of this invention, its use in two difficult situations will be described: parking, beginning with on-street parking; and vendor payments, beginning with a farmers market. Both situations present known difficulties using previous methods. These and other features, aspects, and advantages of the present invention will become better understood with regard to the following drawings, description, and claims.

DETAILED DESCRIPTION OF THE PREFERRED EMBODIMENT

Figure 1:
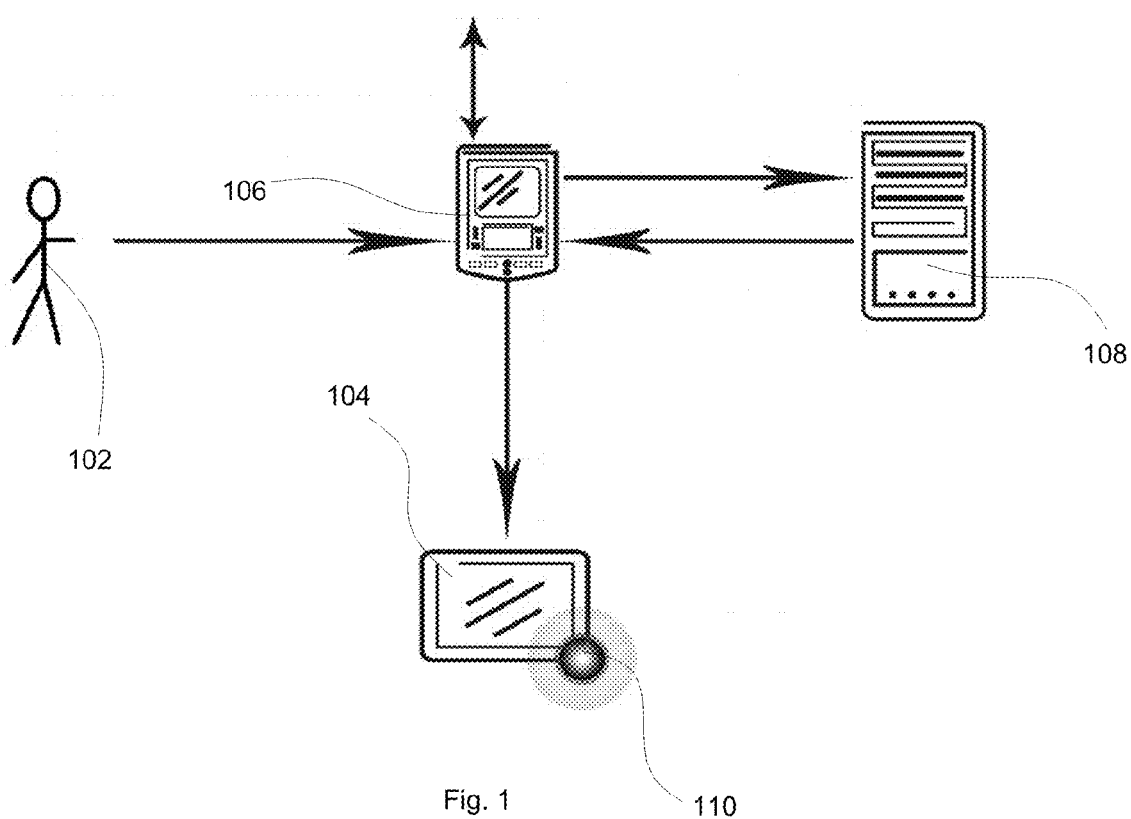
FIG. 1 is a schematic diagram of a pay for parking system according to a first embodiment of the present invention.

The preferred embodiment(s) of the present invention is illustrated in FIGS. 1-5. Turning to FIG. 1, a user 102 inputs and receives information from a smart device 106. The smart device 106 is an electronic device having at least a wireless communication means, geographic location sensing means, data processing capability, and data input/output capability. An example of a suitable smart device is the Apple IPHONE® smart phone, although there are many others in existence.

The smart device 106 is in wireless electronic communication with a computer server 108. The wireless communication means as used throughout this specification includes without limitation 3G, 4G, Edge, WiFi, NFC, and Bluetooth. The location sensing means include without limitation a GPS receiver, a system that triangulates position between cell towers, and hybrid implementations. In one embodiment, a specialized software application can be downloaded and run on the smart device to perform the steps of the present process.

The server 108 also has a software program loaded that receives and sends out communications, calculates amounts due between a payor and a payee, issues authorization codes, and performs banking transactions between a payor and a payee. The server could also be embedded in cloud computing.

A display device 104 is preferably placed inside the parked vehicle in a visible location. The display device 104 is designed to sit on a car dashboard, or an identifier that can be viewed or scanned by meter enforcement personnel. The smart device 106 is in wireless communication with the display device. The device has at least one of an indicator light, printed receipt, UPC code placard, wireless transmitter, or digital readout 110. In operation, the light would be on or display a particular color when the vehicle is properly parked. Instead of a light, a digital readout could display the present parking status, e.g. time left on the meter. Another type of display device could print a receipt that can be placed on the dashboard, allowing compatibility with current Pay & Display meter enforcement procedures. Yet another display device could be any device that can be scanned or sensed by meter enforcement personnel, using a wireless device that could then obtain all the current payment information directly from the server.

Figure 2:
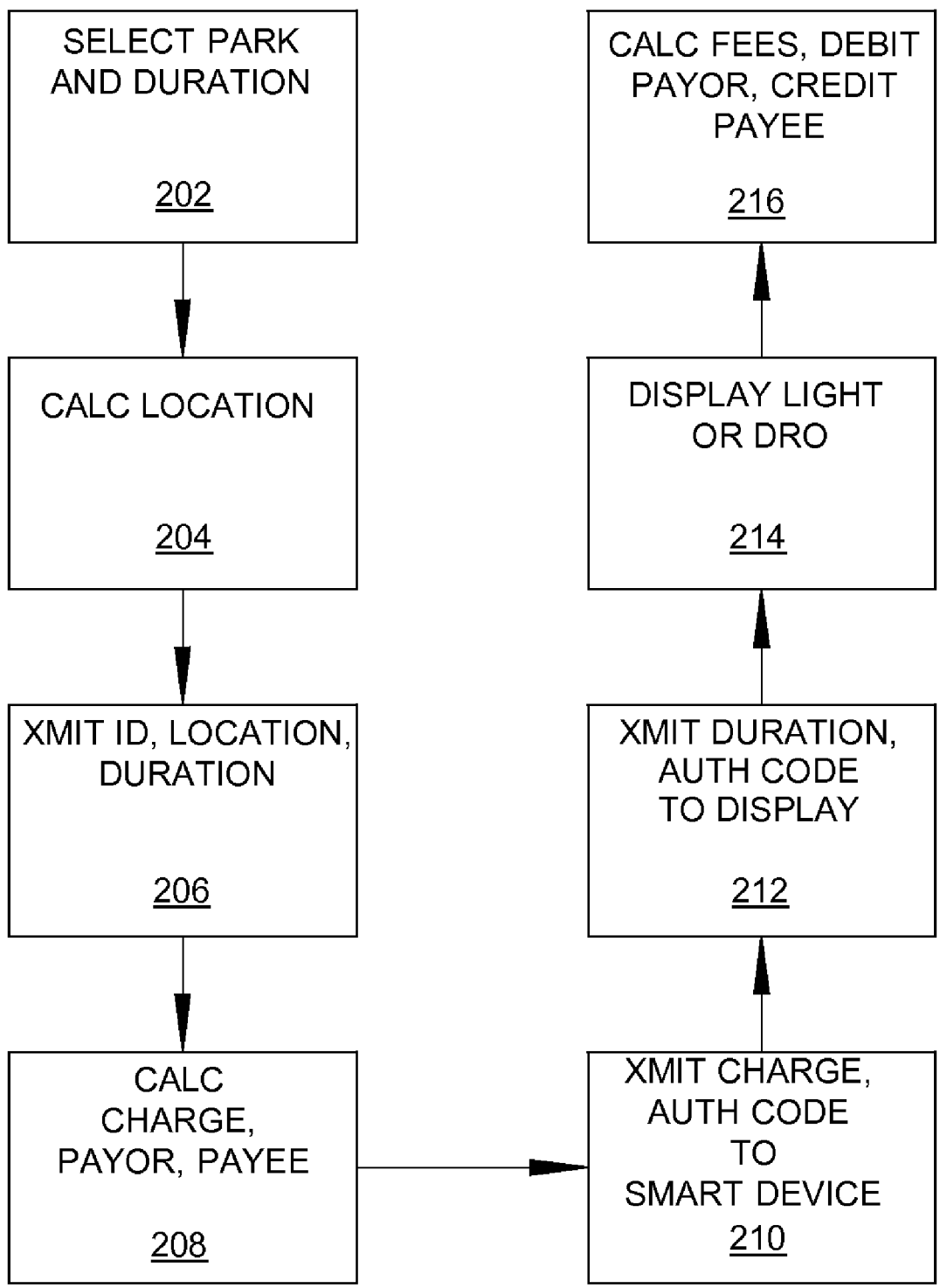
FIG. 2 is a flow chart showing a pay for parking process according to a first embodiment of the present invention.

FIG. 2 shows the method that uses the system described in FIG. 1. The method comprises the following steps. A user selects "park" and "duration" on a smart device having an ID 202. The smart device calculates the present location and accuracy 204. The smart device transmits its ID, location, and duration to a server 206. The server calculates a charge, payor, and payee based on the received ID, location, and duration 208.

Then the server transmits the charge and an authorization code to the smart device 210. The smart device transmits the duration and authorization code to a display device 212. The display device displays one of an indicator light, a printed receipt, UPC code placard, wireless transmitter, or digital read out ("DRO") timer for the duration 214. The server calculates the fees, debiting the payor, and crediting the payee 216.

The parking system embodiment of the present invention is now described in more detail. The city would preferably prepare a parking map of parking zones and charges for the particular community. Note, that although the term "city" is used, the parking authority could also be a university, airport, hospital, private lot, private garage, hotel, mall, or other owner of parking spaces. Also, for example, one city has on street metered parking, off street metered parking, and a parking garage. Hourly charges for all three are identical, but time limits and other regulations are not.

Then the city adds community specific locations to the location database to improve accuracy within this particular city. For example, one city has a community based Wifi network that covers the downtown parking area and also covers the parking garage.

In operation, the PARKER (user, customer) selects button displayed on his or her smart device on prompt enters the time requested (DURATION) 202. The SMART DEVICE calculates latitude, longitude, and accuracy (LOCALE) 204.

The SMART DEVICE transmits PARKER identification (ID), LOCALE and DURATION to SERVER 206. Optionally, based on CLOCK TIME, LOCALE and DURATION, SERVER transmits warnings or information messages, if any, to the SMART DEVICE for display. Examples include: "SNOW emergency, no on-street parking," "No payment required on Sunday," "Payment required until 7 PM," and "Parking free on Christmas, but 2-hour limit applies."

Based on ID, LOCALE, and DURATION. SERVER calculates CHARGE, PAYOR, PAYEE, START TIME, END TIME 208. The server transmits CHARGE and AUTHORIZATION CODE to smart device 210.

Smart device transmits DURATION and AUTHORIZATION CODE to display device 212. Display device turns on light and/or timer or otherwise authorizes parking for DURATION 214.

Server accounting debits PAYOR, calculates FEES, credits PAYEE 216. Smart device stores current location (LOCALE) in car-finder module for later use ((At TIME=(DURATION−7)) Smart Device displays warning message, "Parking about to expire." Instead of 7 minutes, a different predetermined amount of time can be used.

PARKER can purchase more time without returning to car by selecting PARK and entering DURATION, thus repeating above steps. (Note—if PARKER has purchased less than the maximum time allowed at this location, the charge for additional time can be at the same rate. If the PARKER must stay longer than allowed, she must pay at an increased rate, for example. Market forces will then discourage extended stays. This method reduces the number of parking tickets, which are annoying to the PARKER and can be expensive for the town to collect and process).

If parker is unfamiliar with the area, or has left her car in a large lot or garage, he or she can activate the optional car-finder module for directions to her parked vehicle.

The method described above will work with on street, off street, and, in some cases, with parking garages. Garages or lots with gates will require that messages be sent either from the smart device or the server to the gate operating mechanism. RATE will be obtained from the server. DURATION will consist of (EXIT TIME−ENTRY TIME). Server calculates CHARGE, debits PAYOR, calculates FEES, credits PAYEE.

In practice, a system according to one embodiment of the present invention could work as follows:

1. On entry, hit a PARK icon on the smart device to open a gate and check in with the server. This has an advantage over other systems that use expensive hardware at the gate that must be permanently installed so that it knows where it is. The smart device already knows where it is.

2. Upon returning to car, the user hits the PARK Icon to finish parking. The smart device contacts server, which calculates charges and handles payment).

3. The server sends an EXIT TOKEN to the smart device, good for a short period of time typically sufficient to leave the parking lot. This period of time is on the order of about ten minutes.

4. At the gate, the user hits the PARK icon again to raise gate which transmits the EXIT TOKEN from smart device to the gate. Some advantages of this system are speed, convenience, the parking fee is already paid, and no one is stuck blocking the gate having problems with credit card authorization.

This system also works for gated lots and communities where parking is free for some vehicles (e.g. employees, residents) or paid as a monthly fee. Authorization works as above, or a monthly token could be stored in the smart device so that entry and exit does not require communication with the server for each parking session. Server communication may still be desirable for security purposes.

In congested areas, such as New York City, it may not be possible to calculate LOCALE sufficiently accurately to differentiate between on-street parking, a private lot, and a private or public garage. In this case, the system requires an additional step, inserted before the server calculating the charge, payor, payee, start time, and end time:

Using the PARKING MAP developed for this city, the server will list the possible choices on the smart device screen as a selection menu, such as:
  1. ON-STREET
  2. AJAX LOT
  3. GARAGE 43rd St.

After selection above, the process resumes with the calculation step by the server. Parking lots can be handled either by a user entered DURATION or by EXIT TIME−ENTRY TIME.

Enforcement mechanisms—A device will be constructed for placement on the parked vehicles dashboard that will display a green indicator light or elapsed time. This device can be activated by the smart device using DURATION and AUTHORIZATION CODE generated by the Server. A device similar to that of the preceding paragraph could be constructed that will display a green light and start time. This device can be used to enforce different parking limits, such as 15 minute parking, 2 hour parking, 4 hour parking, etc. This device can also be activated by the smart device using DURATION and AUTHORIZATION CODE generated by the server.

Devices similar to those described above may be constructed that obtain DURATION directly from the Server. This will allow additional parking time to be purchased using the smart device without returning to the vehicle.

A parking code sticker or display card can be printed that can be scanned by a smart device carried by parking enforcement personnel. Once the card is scanned the enforcement person can obtain DURATION, START TIME, and TIME REMAINING for this user. A transponder could transmit similar information wirelessly.

Figure 3:
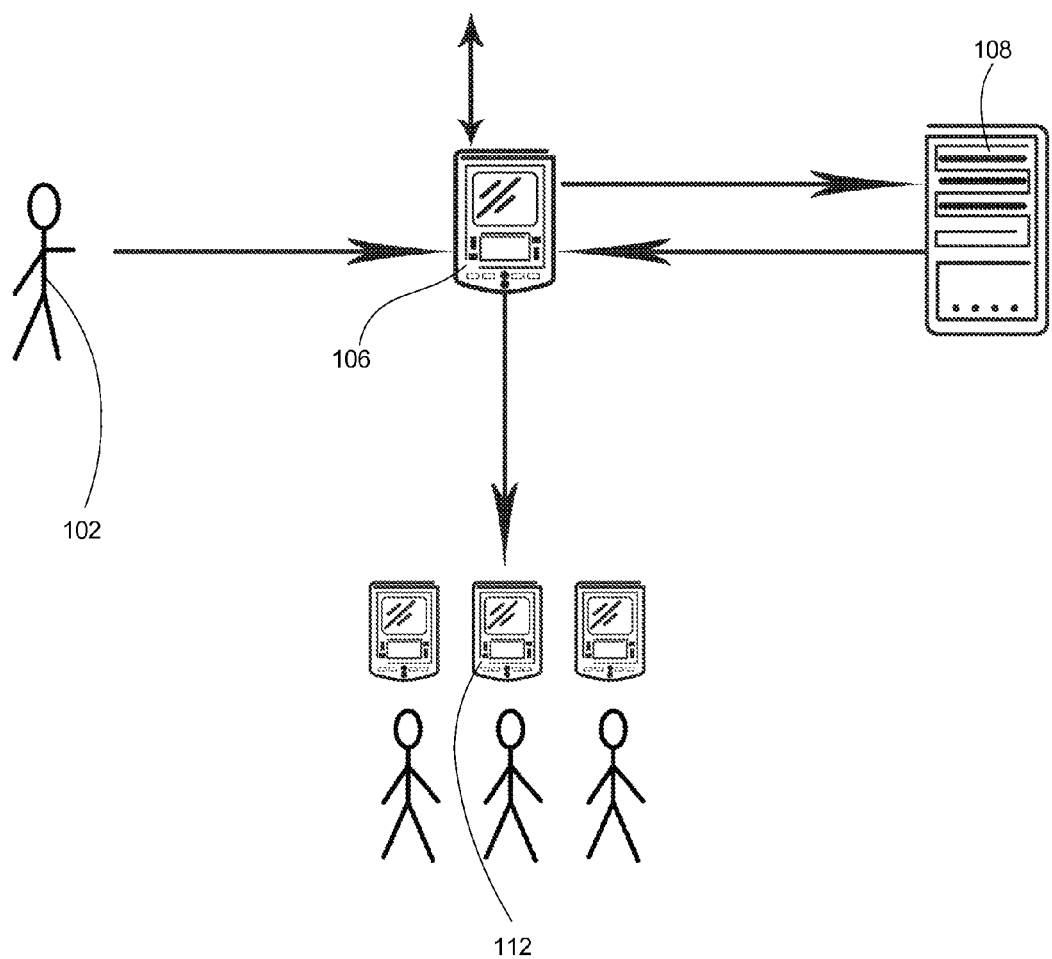
FIG. 3 is a schematic diagram of one aspect of a pay for merchandise system according to a second embodiment of the present invention.
Figure 4:
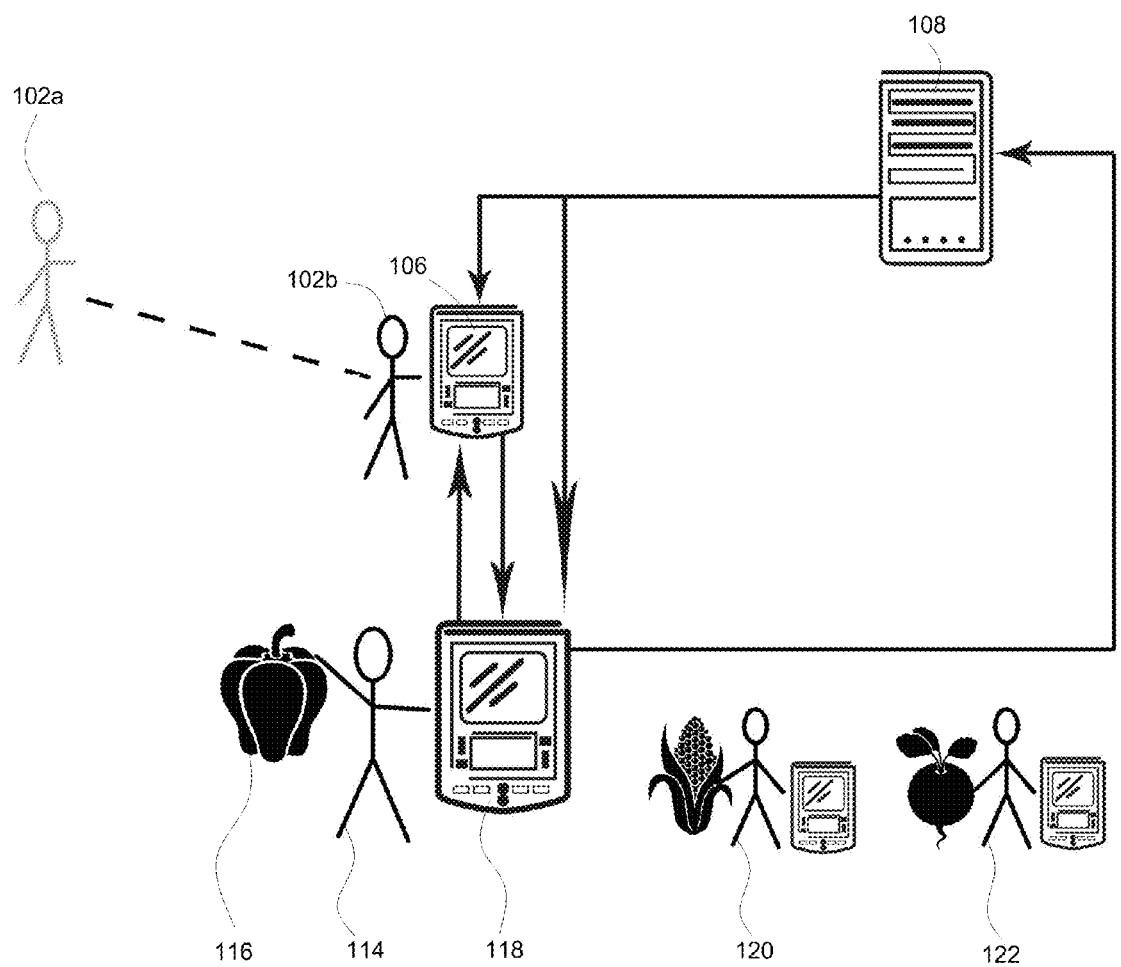
FIG. 4 is a schematic diagram of another aspect of the pay for merchandise system according the second embodiment of the present invention.
Figure 5:
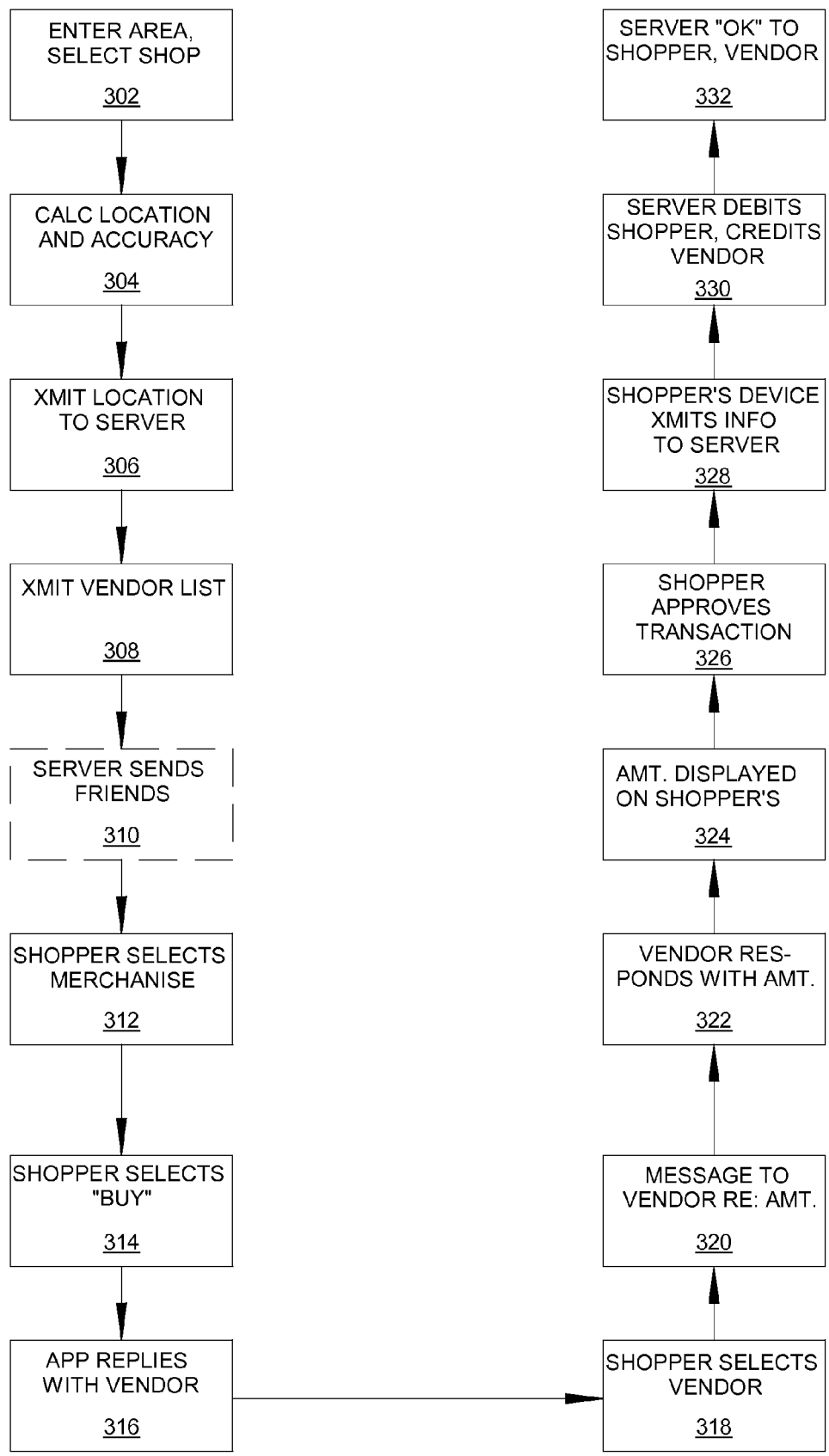
FIG. 5 is a flow chart showing the pay for merchandise process according to the second embodiment of the present invention.

The second embodiment is a shopping application as shown in FIGS. 3-5. Here the most difficult case is illustrated, where both the payor and payee(s) are mobile, such as one would find at a farmer's market, craft fair, or antiques market. Shopping in the normal downtown is a subset of this problem, since the payors are mobile while the payees (stores) are typically fixed; some, such as a hot dog stand, are not. FIG. 3 shows the shopper entering the market area, announcing his or her presence, and locating certain vendors and friends who also use our system. FIG. 4 illustrates the shopping process. Note that the shopper has now moved to the location of a particular vendor and is making a purchase.

In FIG. 3, a shopper 102 has a smart device 106. The smart device 106 is in wireless communication with a server 108. Based on data received, the server identifies FRIENDS or vendors 112 having their own smart devices that are near the shopper 102 and his or her smart device 106.

This application assumes both the shopper 102 and the Vendors 112 have smart devices running the software application of the present invention and assumes a server 108, perhaps, running in the "cloud." The server 108 runs a software program that receives and sends out communications, calculates amounts due between a payor and a payee, issues authorization codes, and performs banking transactions between a payor and a payee.

In FIG. 4, a shopper goes from an initial position 102a to a shopping position 102b near a vendor 114 having such a smart device 118. The shopper chose vendor 114 selling one type of merchandise 116 over two other vendors 120, 122.

FIG. 5 shows the method of the second embodiment of the present invention. A method of paying for merchandise in a transaction between a mobile shopper and a mobile vendor includes the step of a shopper entering an area and selecting a "shop" feature on a smart device 302. The smart device calculates the location and accuracy 304. The smart device transmits the shopper location to a server 306. Optionally, the server responds with friends, organized by distance from the shopper 310. The server transmits a vendor list, organized by distance from the shopper, to the shopper 308.

The shopper visits the vendor and selects a vendor's merchandise 312. The shopper selects the "shop" feature on the smart device 314. An application residing on the smart device replies with vendors by distance 316. The shopper then selects the vendor to pay 318.

A message alert is sent to vendor asking amount 320. The vendor responds with the amount to pay 322. The amount is displayed on the shopper's smart device 324. The shopper selects "ok" on the smart device to pay the vendor 326. The shopper's smart device transmits ID, location, vendor, and amount to the server 328. The server accounting debits shopper and credits vendor 330. The server transmits an "ok" acknowledgement to the shopper's smart device and vendor's smart device 332.

The pay for merchandise embodiment of the present invention is now described in more detail. For outdoor locations, no preliminary work required, but some tuning might be helpful. For indoor locations, add community specific locations to the location database to improve accuracy within this particular community. For example, one city has a community based Wi-Fi network that covers the downtown area and also covers the parking garage. Both VENDORS and SHOPPERS each require a Smart Device, no other hardware is required. No source of power, other than the battery in a smart device, is required.

Shopping Operation. VENDORS enter area, set up at a location, select button CHECK IN. Smart Device calculates location & accuracy (LOCALE). Smart Device transmits VENDOR LOCALE to Server 306.

Shopper enters area, at any time selects button SHOP 302. Smart Device calculates location and accuracy (LOCALE) 304. Smart Device transmits SHOPPER LOCALE to Server 306. Smart Device transmits VENDOR LIST, organized by distance from shopper 308, or Smart Device transmits list of FAVORITE VENDORS, organized by distance, and/or Smart Device transmits list of FRIENDS organized by distance from SHOPPER 310.

SHOPPER moves around, visits vendors, selects merchandise. SHOPPER selects button BUY. Server responds with VENDOR LIST organized by distance from SHOPPER. Shopper selects appropriate vendor from list.

Message alert routed to VENDOR requesting AMOUNT 320. VENDOR enters payment AMOUNT 322. AMOUNT displayed on screen of SHOPPER Smart Device 324. Shopper approves transaction, for example by pressing OK, and thereby pays vendor 326.

Smart Device transmits ID, VENDOR, and AMOUNT to Server 328. Server accounting debits PAYOR (ID), credits PAYEE, calculates FEE 330. Server transmits OK to SHOPPER and VENDOR Smart Devices 332. Transaction complete, begin again at 302.

If the VENDOR selects a suitable Smart Device (larger display, keyboard) the VENDOR application can easily be upgraded to an electronic cash register application which tracks merchandise, calculates charges and taxes, updates inventory, and so on. For International travelers, all of the financial calculations can be done simultaneously in two currencies with the appropriate currency being displayed on each screen.

A less difficult version than that described above is one wherein only one of the two parties involved in the transaction is mobile. This might be the case where a vendor has many locations such as a fast-food franchise. It will be described as Restaurant DD herein. The vendor wishes to service as many customers as possible as quickly as possible. In certain service situations, such as drive-through windows, it is difficult to allow a customer to swipe a credit or debit card.

For these and similar multi-location businesses or restaurant chains, it is sometimes desirable to process credit payments centrally. Processing credit payments centrally allows the chain to negotiate the best possible rates with credit card companies and/or other credit servicing companies. It also allows central exception processing (e.g. refunds), bookkeeping, and other services provided by the chain to individual stores or franchises. An example of how the process would work follows:

Sample Application 1.
1. Customer enters drive thru line at Restaurant DD.
2. Customer hits icon "DD" on his smart device.
3. Smart device transmits its geographic location to a server, and the server uses this location to identify the particular store involved.
4. A menu appears on the smart device.
5. Customer selects merchandise, hits ENTER.
6. Order is transmitted to local store and to central server.
7. Payment is made, as described previously.
8. Customer moves up to the drive thru window and receives his or her merchandise.

The advantage of this version is that payment is made before the customer order is made up and bagged, saving a great deal of time and labor.

Sample Application 2.
1. Customer drives up to outdoor microphone as is currently done, relays order to clerk, says pay by smart device.
2. Customer drives to window, learns amount from clerk, hits icon "DD" and enters amount.
3. Amount goes to server, identifies store location and sends signal "OK" to store (either special device or existing cashier device, if possible).
4. If possible, the existing cashier device can transmit the amount to the server, but the actual devices used and their capabilities may vary from chain to chain.

There are many advantages of the present invention over the prior art. As a preliminary matter, it is important to note that the parking industry in the United States today is driven by several dominant factors.

The first factor is that cities are, of necessity, trying to set up systems that will allow them to increase the fees for parking in their downtown commercial areas. The discrepancy between what is usually charged for garage or lot parking, and the fees for metered street parking, are so great that it causes wide spread distortions of parking behavior (drivers will drive for extended periods to find a non-existent space on the street when a very suitable space is available in a lot or garage—it just costs more).

The second major factor is that drivers will pay for convenience. "Fast Pass" toll systems have proven that beyond any reasonable doubt. The system and method of the present invention offers the most convenient parking system yet seen in the marketplace. It also addresses the need of the parking public to have a way to pay for parking that has maximal convenience factors and can be used in multiple communities without regard to geography. It also provides way to pay that has all of the advantages of electronic payment without fear of identity theft or other security issues.

The system and method of the present invention also provides the only parking payment system that features a location service, thereby making it easier for the parker to find a space or to find his vehicle in a crowded lot. Since there is no value on the in-vehicle device itself, there is no real threat of vandalizing the vehicle to gain access to the in-vehicle device. From the city's perspective, it creates a highly enforceable, error-free way of allowing the parking public to visit the city, park and leave without experiencing any frustration over the parking process.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A location-aware payment system comprising:
   a smart device, the smart device configured to at least:
      receive a selection from a user of a park request and specification of a duration; and
      calculate a location of the user and accuracy of the location;
      transmit the location, the duration, and a smart device ID to a server;
      transmit the duration to a display device;
   a server, the server configured to at least:
      receive from the smart device the location, the duration, and the smart device ID and in response calculate a charge, a payor, and a payee based on the received smart device ID, location, and duration; and
      transmit the charge and an authorization code to the smart device; a display device, wherein the display device is physically separate from the smart device and the server and configured to at least:
      receive the duration from the smart device; and
      display at least one of an indicator light, receipt, code, placard, or the duration.

2. The system of claim 1, further comprising a software program configured to perform banking transactions between the payor and the payee.

3. The system of claim 2, wherein the software program is also configured to issue authorization codes.

4. The system of claim 1, wherein the smart device is configured to determine the location using at least one of a GPS receiver, a system that triangulates position between cell towers, a WiFi positioning system receiver, and an XPS receiver.

5. The system of claim 1, wherein the smart device is configured with wireless communication using at least one of 3G, 4G, Edge, WiFi, NFC, and Bluetooth.

6. A method of paying for parking comprising the steps of:
   receiving a user selection of a park option and specification of a duration on a smart device having an ID;
   calculating, by the smart device, a location of the user and accuracy of the location;
   transmitting the smart device ID, location, and duration to a server;
   in response to transmitting the smart device ID, location, and duration to the server, calculating a charge, a payor, and a payee based on the received smart device ID, location, and duration;
   transmitting the charge to the smart device by the server;
   transmitting the duration to a display device by the smart device, wherein the display device is physically separate from the smart device and the server; and
   the display device displaying one of an indicator light, receipt, code placard, or the duration.

7. The method of claim 6 further comprising the step of calculating a fee, debiting the payor, and crediting the payee.

8. The method of claim 6 further comprising the step of transmitting an information message to the smart device.

9. The method of claim 6 further comprising the step of the smart device displaying a warning message at a pre-determined amount of time before the end of the duration.

10. The method of claim 9 further comprising the step of purchasing additional duration using the smart device by repeating the previous steps.

* * * * *